Nov. 18, 1958   H. E. SLOAN ET AL   2,860,884
CLAMPING JAWS FOR CHUCKS
Filed Jan. 31, 1957   2 Sheets-Sheet 1
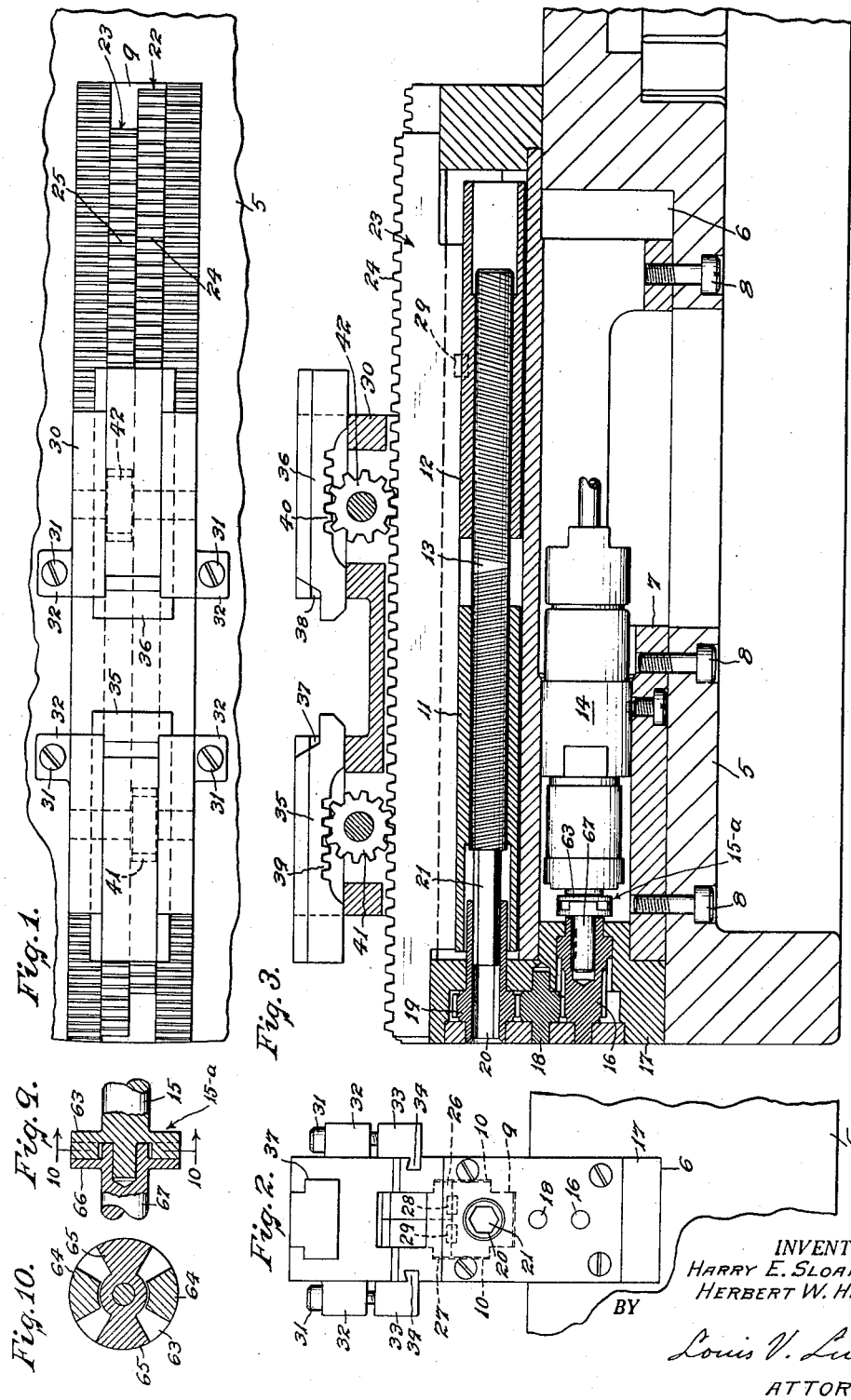
INVENTOR
HARRY E. SLOAN.
HERBERT W. HICKEY.
BY
Louis V. Lucia
ATTORNEY.

Nov. 18, 1958    H. E. SLOAN ET AL    2,860,884
CLAMPING JAWS FOR CHUCKS
Filed Jan. 31, 1957    2 Sheets-Sheet 2
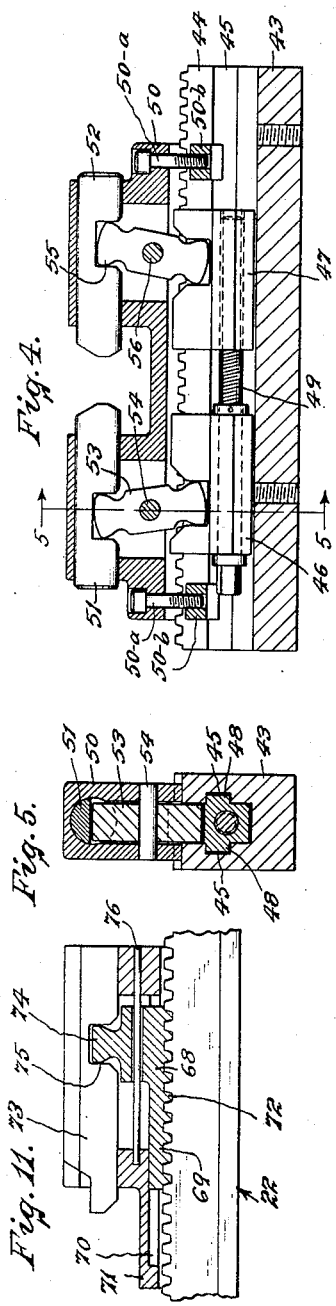
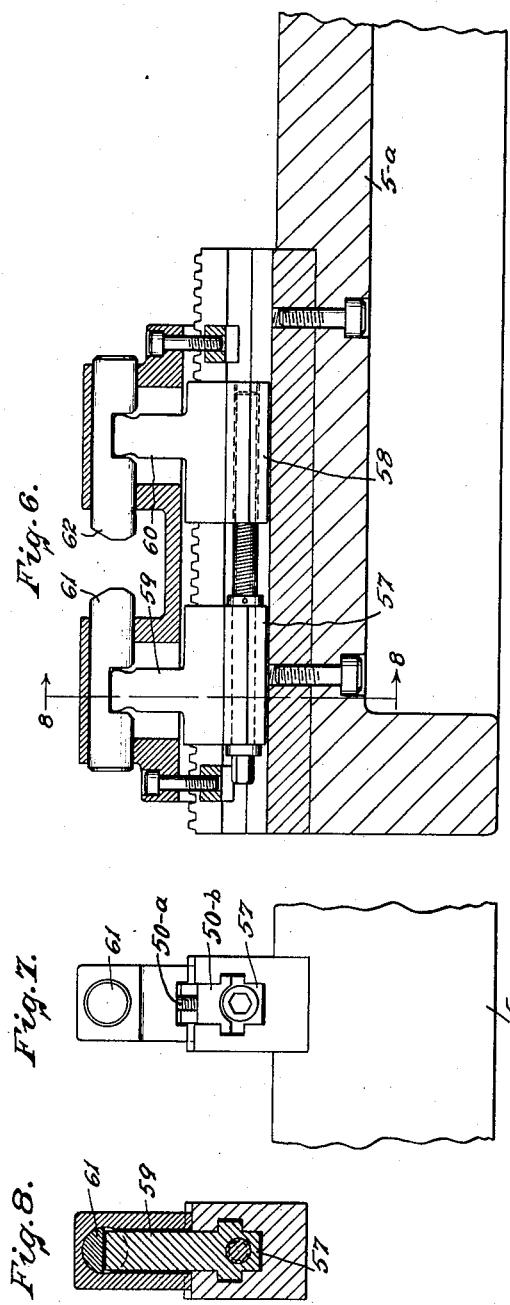
INVENTOR.
HARRY E. SLOAN.
HERBERT W. HICKEY.
BY
*Louis V. Lucia*
ATTORNEY.

United States Patent Office 2,860,884
Patented Nov. 18, 1958

2,860,884

CLAMPING JAWS FOR CHUCKS

Harry E. Sloan and Herbert W. Hickey, Hartford, Conn., assignors to The Cushman Chuck Company, Hartford, Conn., a corporation of Connecticut Application January 31, 1957, Serial No. 637,443

15 Claims. (Cl. 279—112)

This invention relates to clamping jaws for chucks and the like and more particularly to a clamping jaw set which is self-adjustable to a workpiece and is adapted to automatically clamp the workpiece to a chuck base and the like; it being an object of the invention to provide novel improvements in the clamping jaws for chucks which operate on the principle described in United States Patent No. 2,757,009.

It has been found that, as such clamping jaws are tightened against the workpiece and a pivotal movement is theoretically applied thereto which automatically secures the jaws to the base by cramping them in their respective slots, as set forth in the above mentioned patent, there is a tendency for the top jaws to move upwardly relatively to the surface of the chuck base and such upward movement can result in raising the workpiece relatively to the chuck base as it is brought into clamping position. Although the workpiece may be so raised for a distance of only a few thousandths of an inch, it could cause an objectionable error in cases where such upward movement is greater than the limit of error allowed in the cutting or finishing operation that is performed upon the workpiece while clamped in position upon the chuck.

It is a further object of this invention, therefore, to provide improved means for preventing the top jaws of a clamping jaw set, which actually engage the workpiece, from being affected by the pivotal movement of the master jaws which cause the said master jaws to become automatically secured to the chuck base.

It is a further object of this invention to provide a construction in which the top clamping jaws are indirectly operated by the master jaws in such a manner that any pivotal movement of the master jaws is not transmitted to the top jaws.

A further object of the invention is to provide operating means between the master jaws and top jaws which will counteract any objectionable movement of the master jaws during a clamping operation and thereby prevent any disturbance of a predetermined position of the workpiece upon the chuck base, in a direction perpendicular thereto, by the operation of clamping the workpiece to said base.

Further objects and advantages of the present invention will be more clearly understood from the following description and the accompanying drawings in which:

Fig. 1 is a plan view of a clamping jaw set embodying the present invention.

Fig. 2 is an end view thereof.

Fig. 3 is a view, in central vertical section, of said clamping jaw set with parts thereof being shown in elevation.

Fig. 4 is a sectional side view illustrating a modified form of our invention.

Fig. 5 is a sectional end view on line 5—5 of Fig. 4.

Fig. 6 is a sectional side view of a further modified form of our invention.

Fig. 7 is an end view thereof.

Fig. 8 is a sectional view on line 8—8 of Fig. 6.

Fig. 9 is a side view, partly in section, illustrating the construction of the lost motion coupling used in connection with the present invention.

Fig. 10 is a sectional end view on line 10—10 of Fig. 9.

Fig. 11 is a sectional side view showing one of two similar ends of a modified form of top jaw unit also embodying the present invention.

As illustrated in the drawings, the numeral 5 denotes the base of a chuck, such as shown and described in the above mentioned United States patent, in which there is provided a plurality of radial slots 6 for receiving and locating upon said base a plurality of sets of clamping jaws.

Each of said sets of clamping jaws includes a bar 7 which fits within one of the slots 6 and is secured to the base by means of screws 8. The said bar has therein a longitudinal slot 9 having opposed lateral slots 10—10 in the side walls thereof.

Within the slot 9 and above the master jaws 11 and 12, master clamping jaws 11 and 12 having lateral flanges which are slidable in the lateral slots 10—10. The said master jaws are connected by a clamping screw 13 that is threaded to said jaws for moving them in opposite directions into and out of clamping position within the slot 9.

In order to rotate the said clamping screw 13, there is preferably provided a suitable motor 14 of the compressed air type having a drive shaft 15 that is preferably connected, through a lost motion coupling 15-a, to a drive pinion 16 of a gear train which is mounted in a gear box 17 that closes the outer end of the slot 9. The said gear train includes an idler pinion 18 and a driven pinion 19 having an axial recess 20 which slidably and non-rotatably receives a shank portion 21 of the clamping screw 13 and is accessible from the side of the chuck to receive a suitable tool or wrench for manual rotation of the clamping screw.

Within the slot 9 and above the mast jaws 11 and 12, there is slidably contained a pair of rack bars 22 and 23 having gear teeth 24 and 25 thereon and provided with opposed lateral flanges 26 and 27 which extend into the lateral slots 10—10, between the flanges of the master jaws and the upper walls of said slots, and slidably retain the said bars within the slot 9.

The said rack bar 22 is connected to the master jaw 11 by means of a suitable key 28 and the rack bar 23 is connected to the master jaw 12 by a similar key 29 in order that each of said bars may be separately moved within the slot 9 by its respective master jaw.

Upon the bar 7, there is mounted a top jaw unit which includes a mounting member 30 that is adjustably secured upon the top of said bar by means of clamping screws 31 which extend through ears 32 on said mounting member and are threaded to the clamping lugs 33—33 that are slidably secured to the opposite sides of the bar 7 by dovetail and slot connections 34—34.

The said mounting member 30 has slidably mounted thereon opposed top clamping jaws 35 and 36 which are slidable in slots 37 and 38 in said base member and have on their undersides a series of gear teeth 39 and 40, respectively. The gear teeth 39 of the jaw 35 mesh with a pinion 41 that is rotatably mounted in the mounting member 30 and is in mesh with the gear teeth 24 of the rack bar 22. The teeth 40 of the jaw 36 mesh with a similar pinion 42 that meshes with the teeth 25 of the rack bar 23.

The operation of the above described mechanism is as follows: The workpiece which is desired to be clamped to the chuck base is placed between the top jaws 35 and 36 and located on the chuck base by suitable means, such as the centering means described in the copending application of Linwood B. Swanson and Jerome J. Rutherford, Jr., Serial No. 637,003, filed January 29, 1957. The screw 13 is then rotated, either by the motor 14 or by a suitable hand tool inserted in the recess 20; and rotation of the said clamping screw in clockwise direction will move the master jaws 11 and 12 away from each other, due to the left and right screw threads between the clamping screw 13 and the respective jaws 11 and 12, and thereby cause the bars 22 and 23 to move with their respective master jaws and rotate their respective pinions 41 and 42. The said pinions will then move their respective top jaws 35 and 36 toward each other into clamping engagement with the workpiece. As one of the top jaws engages the workpiece, the said top jaw and its respective master jaw will come to a stop. Continued rotation of the clamping screw will continue the movement of the other master jaw and its respective rack bar and thereby also continue the movement of the other top jaw until it comes into contact with the opposite side of the workpiece. Further rotation of the clamping screw, after both top jaws are in engagement with the workpiece, will theoretically apply a pivotal movement to the master jaws 11 and 12 about their point of contact with the workpiece and thereby cause the lateral flanges of the said master jaws to bind between the bottom walls of the slots 10—10 and the bottom surfaces of the racks 22 and 23 and thereby automatically secure the master and top jaws in their clamping position against the workpiece and also secure the workpiece to the chuck base.

When it is desired to release the workpiece, the clamping screw 13 is rotated in a counterclockwise direction to thereby move the clamping jaws 35 and 36 in opposite directions and away from the workpiece.

It will be noted that the theoretical tilting, or pivotal action of the master jaws will operate to force the rack bars 22 and 23 against the upper walls of the lateral slots 10—10 so that when more force is applied for rotating the clamping screw 13, after the top jaws have engaged the opposite sides of the workpiece, more pressure will be applied between the flanges 26 and 27 of the rack bars and the upper walls of the lateral slots 10—10 and between the flanges of the master jaws and the lower walls of said slots, thereby firmly securing to the chuck base the entire clamping jaw set with the work-piece clamped therebetween.

Any upward movement of the bars 22 and 23, which may result from the force applied thereto by the tilting action of the master jaws, will be prevented from being transmitted to the upper jaws 35 and 36 since the said upward movement would be taken up by the respective side flanges of said rack bars so that the tightening effect of the master jaws will not disturb the plane of the top jaws relatively to the chuck base and thereby prevent any error in the operation of machining the workpiece. Also, the sliding engagement between the gear teeth of the rack bars and their respective pinions will prevent any upward movement from being transmitted to the top jaws.

In the modified form of our invention illustrated in Figs. 4 and 5, the liner bar 43 has a slot 44 therein with lateral slots 45—45 in the side walls thereof. Each of the master jaws 46 and 47 is separately slidable in the slot 44 and has lateral flanges 48—48 which snugly fit the said lateral slots. The said master jaws are connected by a clamping screw 49 which is rotatable in the jaw 46 and threaded to the jaw 47.

A mounting member 50 is secured upon the bar 43 by means of clamping screws and nuts 50–a and 50–b, respectively, and a pair of top jaws 51 and 52 are slidably mounted in said member. The master jaw 46 is connected to the top jaw 51 by means of a rocker lever 53 which is pivoted on a shaft 54, that is mounted in the member 50, and the master jaw 47 is connected to the top jaw 52 by means of a similar lever 55 that is pivoted on a shaft 56 which is also mounted on said member 50. The said levers 53 and 55 have their ends fitting into notches in their respective top jaws and master jaws, as clearly illustrated in the drawing, and rotation of the clamping screw 49 will operate to move the master jaws in opposite directions and consequently rock the levers 53 and 55 accordingly and thereby also move the top jaws 51 and 52 in opposite directions.

The said master jaws 46 and 47 are also self-adjustable to a workpiece positioned between the top jaws and adapted to theoretically tilt in the slots 45—45, as they are forced into clamping position by the screw 49, and thereby become cramped in said slots and automatically secure the top jaws in clamping position against the workpiece. Any vertical movement of the master jaws caused by the cramping action thereon will be absorbed by the vertically slidable connections between the master jaws and the top jaws and their respective operating levers 53 and 55 and therefore will not be transmitted to the top clamping jaws.

In the further modified form illustrated in Figs. 6 to 8, the mechanism is similar to that shown in Fig. 4 with the exception that, instead of the levers 53 and 55, the master jaws 57 and 58 have vertical extensions 59 and 60 which project upwardly therefrom and fit into the notches of their respective top jaws 61 and 62.

The lost motion coupling 15–a is provided in order to allow free starting of the motor 14, when it is energized to reverse the rotation of the clamping screw 13 for disengaging the clamping jaws from the workpiece, and thereby avoid the possibility of the motor stalling under the initial overload applied thereto in starting movement of the master jaws from their cramped positions in the slots 10—10.

As shown in Figs. 9 and 10, the said coupling may include a disc-shaped portion 63, on the motor shaft 15, having segmented projections 64—64 which are disposed between similar projections 65—65 on a disc-shaped portion 66 which has a shaft 67 that is keyed to the drive pinion 16 of the gear train; the said projections 64—64 being angularly spaced from the projections 65—65 to allow a predetermined amount of free rotation of the shaft 15 so that the motor may gain momentum before becoming coupled to the gear train.

In the form illustrated in Fig. 11, the construction of the top jaw unit is similar to that illustrated in Figs. 1 to 3 with the exception that for each of the pinions 41 and 42, there is provided and operating member 68 having a base 69 which is slidable in a slot 70, in the bottom of the mounting member 71, and has teeth 72 thereon which are adapted to mesh with the teeth of the respective rack 22 or 23. The said operating member 68 is connected to the top jaw 73 by means of a projection 74, which extends into a notch 75 in said top jaw, and is slidably attached to the mounting member by means of a rod 76 whereby it is retained on said mounting member when the top jaw unit is removed from the base member.

It will also be noted that each of the top jaw units above described may be located in different positions along the top of its respective base member so as to adapt a chuck for accommodating workpieces of different diameters without changing the position of the base member upon the chuck base. For this purpose, teeth are provided in the top of the base member, along the opposite sides of the slot 9 therein, and cooperating teeth are also provided in the bottom of each mounting member. The entire jaw unit is thus adapted to be clamped in any position along the top of the base member and the meshing of the teeth on the mounting member with the corresponding teeth on the base member will firmly secure the top jaw unit against longitudinal movement relatively to the base member when clamped thereon by the clamping means 31 to 34, shown in Figs. 1 and 2, or 50–a and 50–b, shown in Figs. 4, 6 and 7.

It will be understood from the above description that our invention provides a highly efficient means of connecting a set of master jaws with their respective top jaws in such a manner as to prevent any displacement of the master jaws, that may occur during the operation thereof, from causing an error in the workpiece that is clamped between the said top jaws.

It will be noted that the points of contact between the top jaws and their operating means and the portions of said jaws which engage the workpiece lie substantially in a single plane which is parallel to the direction of movement of the top jaws so that there is no tendency of the top jaws to pivot as they are forced into clamping engagement with the workpiece and perpendicular movement of the top jaws is thereby prevented.

We claim:

1. A clamping jaw set including a base member having therein a slot with lateral slots in the side walls thereof, a pair of master jaws independently slidable in said slot and having lateral flanges fitting in the said lateral slots, a pair of top jaws mounted on said base member, a clamping screw threaded to said master jaws for moving them in opposite directions, and means for transmitting longitudinal movement of the master jaws along said slot to the top jaws; the said means being incapable of causing movement of the top jaws in a direction perpendicular to the plane of the said base member upon engagement thereof with the workpiece.

2. A clamping jaw set including a base member having a longitudinal slot therein, a pair of master jaws, jointly and independently slidable in said slot, a pair of top jaws slidably mounted upon the said base member, a clamping screw connecting said master jaws for movement in opposite directions, and means between said master jaws and top jaws capable of moving the top jaws on a plane parallel to the direction of movement of the master jaws and incapable of moving said top jaws in a direction perpendicular to said plane upon engagement thereof with the workpiece.

3. A clamping jaw set including a base member having a longitudinal slot therein, a pair of master jaws independently slidable in said slot, a clamping screw interconnecting said master jaws for moving them in opposite directions, a pair of elongated toothed racks slidable on said base and each connected to a separate one of said master jaws for movement therewith independently of the other rack, a pair of top jaws mounted upon said base member and having a series of teeth thereon, and a pinion between each of said top jaws and a separate one of said racks and in mesh with the teeth thereof for transmitting movement of the rack to the respective top jaw.

4. A set of clamping jaws for chucks and the like including a base member having an elongated slot therein, a pair of master jaws slidable in said slot, a pair of toothed racks also slidable in said slot and separately connected to said master jaws for movement therewith, a supporting member mounted upon the base member and adjustable along the said slot, a pair of top jaws slidable in said supporting member, and means mounted on said supporting member and capable of positively transmitting movement from each of said racks to a separate one of said top jaws along a single plane and incapable of causing movement of said top jaws in a direction crosswise to said plane upon engagement thereof with the workpiece.

5. A clamping jaw set including a base member having an elongated slot therein, a pair of master jaws slidable in said slot, a clamping screw connecting said master jaws for movement in opposite directions along said slot, a pair of juxtapositioned toothed racks independently slidable in said slot and each connected to a separate one of said master jaws, a supporting member mounted upon said base member and adjustable along the said slot, a pair of top jaws slidably mounted upon said supporting member, the said top jaws having a series of teeth thereon, and a pair of separate pinions each separately journalled in said supporting member and in mesh with the teeth of one of said top jaws and a respective one of said toothed racks.

6. A set of clamping jaws for chucks and the like including a base member adapted to be mounted in a slot in the body of a chuck, the said base member having therein an elongated slot with lateral slots in the side walls thereof, a pair of master jaws slidable in said elongated slot and having side flanges extending into said lateral slots, a clamping screw connecting said master jaws for movement in opposite directions, a pair of juxtapositioned toothed rack bars slidable in said elongated slot and each having a lateral flange extending into one of said lateral slots and disposed between the tops of the master jaws and the top wall of the respective lateral slot, means securing one of said racks to each of said master jaws for movement therewith, a supporting member mounted upon and adjustable along the top of the said base member, a pair of top jaws slidably mounted in said supporting member, the said top jaws having a series of gear teeth thereon, and a separate pinion journalled on said supporting member and disposed between each of said top jaws and its respective rack and in mesh with the teeth thereof.

7. A clamping jaw set for a chuck and the like including a base member having an elongated slot therein, a pair of master jaws slidable in said slot, a clamping screw connecting said master jaws for movement in opposite directions in said slot, a supporting member mounted upon the top of the base member, a pair of top jaws slidable in said supporting member, and means separately connecting each of said top jaws with a separate one of the master jaws for movement therewith; said means including a lever journalled upon the supporting member and having opposite end portions extending into notches in the respective top and master jaws and capable of transmitting direct movement from the master jaws to the top jaws on a single plane and incapable of causing movement of the top jaws in a direction crosswise to said plane upon engagement thereof with the workpiece.

8. A clamping jaw set including a lower base having an elongated slot therein, a pair of master jaws slidable in said slot, a clamping screw interconnecting said master jaws for movement in opposite directions along said slot, a pair of top jaws slidably mounted above the said master jaws, and an extension on each of said master jaws extending into a separate one of the top jaws and capable of transmitting direct movement from the master jaw to the respective top jaw on a single plane and incapable of causing movement of the top jaw in a direction crosswise to said plane upon engagement thereof with the workpiece.

9. In a chuck including a base member having a slot therein, the combination of a clamping jaw set having a pair of master jaws separately slidable in said slot, a clamping screw for operating said jaws into and out of clamping position, means for automatically securing said master jaws to the base member upon being forced into engagement with a workpiece, a gear train mounted upon said base member for rotating said clamping screw, a motor for driving said gear train, and a lost motion coupling between said motor and gear train providing for free starting of the motor before becoming coupled to the gear train.

10. A clamping jaw set including an elongated base member having a longitudinal slot therein, a pair of master jaws slidable in said slot, a clamping screw interconnecting said master jaws for moving them in opposite directions, a mounting member mounted upon said base member and having a pair of top jaws slidable thereon, operating members carried on said mounting member for operating said top jaws, means separately connecting said operating members to said master jaws, and means for securing said mounting member in different positions along the top of the base member.

11. A clamping jaw set including an elongated base member having a longitudinal slot therein, a pair of master jaws slidable in said slot, a clamping screw interconnecting said master jaws for moving them in opposite directions, a top jaw unit including a mounting member mounted upon the top of said base member, a pair of top jaws slidable on said mounting member, operating members carried on said mounting member for operating said top jaws, means separately connecting said operating members with said master jaws, and means including cooperating teeth upon the top of the base member and the bottom of the mounting member for selectively securing the top jaw unit in different positions along the said base member.

12. A clamping jaw set for a chuck and the like including a base member having a longitudinal slot therein, a pair of master jaws slidable in said slot, a clamping screw interconnecting said master jaws for moving them in opposite directions, a pair of elongated toothed racks slidable on said base and each connected to a separate one of said master jaws for movement therewith, a top jaw unit including a mounting member having a pair of top jaws slidably mounted thereon, each of said top jaws having a series of teeth along the bottom thereof, a pair of pinions rotatably mounted on said mounting member and each in mesh with the teeth of a separate one of said top jaws and adapted to be positioned in mesh with the teeth of its respective rack when the top jaw unit is located in different positions along the top of the base member, and means for securing the said top jaw unit in said positions including meshable teeth along the top of the base member and the bottom of the mounting member.

13. A clamping jaw set including a base member having a longitudinal slot therein, a pair of master jaws slidable in said slot, a clamping screw interconnecting said master jaws for moving them in opposite directions, a pair of elongated toothed racks slidable on said base and each connected to a separate one of said master jaws for movement therewith, a top jaw unit including a mounting member mounted upon the top of said base member and having a pair of top jaws slidable thereon, a pair of operating members slidable in said mounting member and separately connected to each of the top jaws, each of said operating members having teeth along the bottom thereof meshable with the teeth of its respective rack, and means for securing the said top jaw unit in different positions lengthwise of the base member including meshable teeth along the top of said base member and the bottom of the mounting member.

14. A clamping jaw set including an elongated base member having a longitudinal slot therein, a pair of master jaws slidable in said slot, a clamping screw interconnecting said master jaws for moving them in opposite directions, a pair of elongated rack bars slidable on said base member and each connected to a separate one of said master jaws for movement therewith, each of said rack bars having a series of teeth along the top thereof, a top jaw unit including a mounting member mounted upon the top of said base member and having a pair of top jaws slidable thereon, and a pair of operating members each slidable in a slot in the bottom of said mounting member, the said operating members each having a projection extending into a notch in one of said top jaws and teeth in the bottom thereof adapted to mesh with the teeth of its respective rack in different positions along the said rack.

15. A clamping jaw set including a base member having a slot therein, a master jaw slidable in said slot, a top jaw slidably mounted upon said base member and having a work engaging portion, means for moving said master jaw, and operating means between said master and top jaw for moving the top jaw into engagement with a workpiece; the point of contact between the said operating means and the top jaw and the work engaging portion of the top jaw lying substantially in a single plane parallel to the direction of movement of the top jaw whereby movement of said jaw in a direction perpendicular to said plane is prevented.

References Cited in the file of this patent
UNITED STATES PATENTS

| 746,707 | Jecklin | Dec. 15, 1903 |
| 1,511,298 | Petzold | Oct. 14, 1924 |
| 2,289,051 | Semerak | July 7, 1942 |
| 2,757,009 | Sloan et al. | July 31, 1956 |

UNITED STATES PATENT OFFICE
CERTIFICATE OF CORRECTION

Patent No. 2,860,884 November 18, 1958

Harry E. Sloan et al.

It is hereby certified that error appears in the printed specification of the above numbered patent requiring correction and that the said Letters Patent should read as corrected below.

Column 2, line 20, for "9 and above the master jaws 11 and 12," read -- 9, there is slidably mounted a pair of --; line 39, for "mast" read -- master --.

Signed and sealed this 3rd day of March 1959.

(SEAL)
Attest:

KARL H. AXLINE

Attesting Officer

ROBERT C. WATSON
Commissioner of Patents